Patented Jan. 3, 1928.

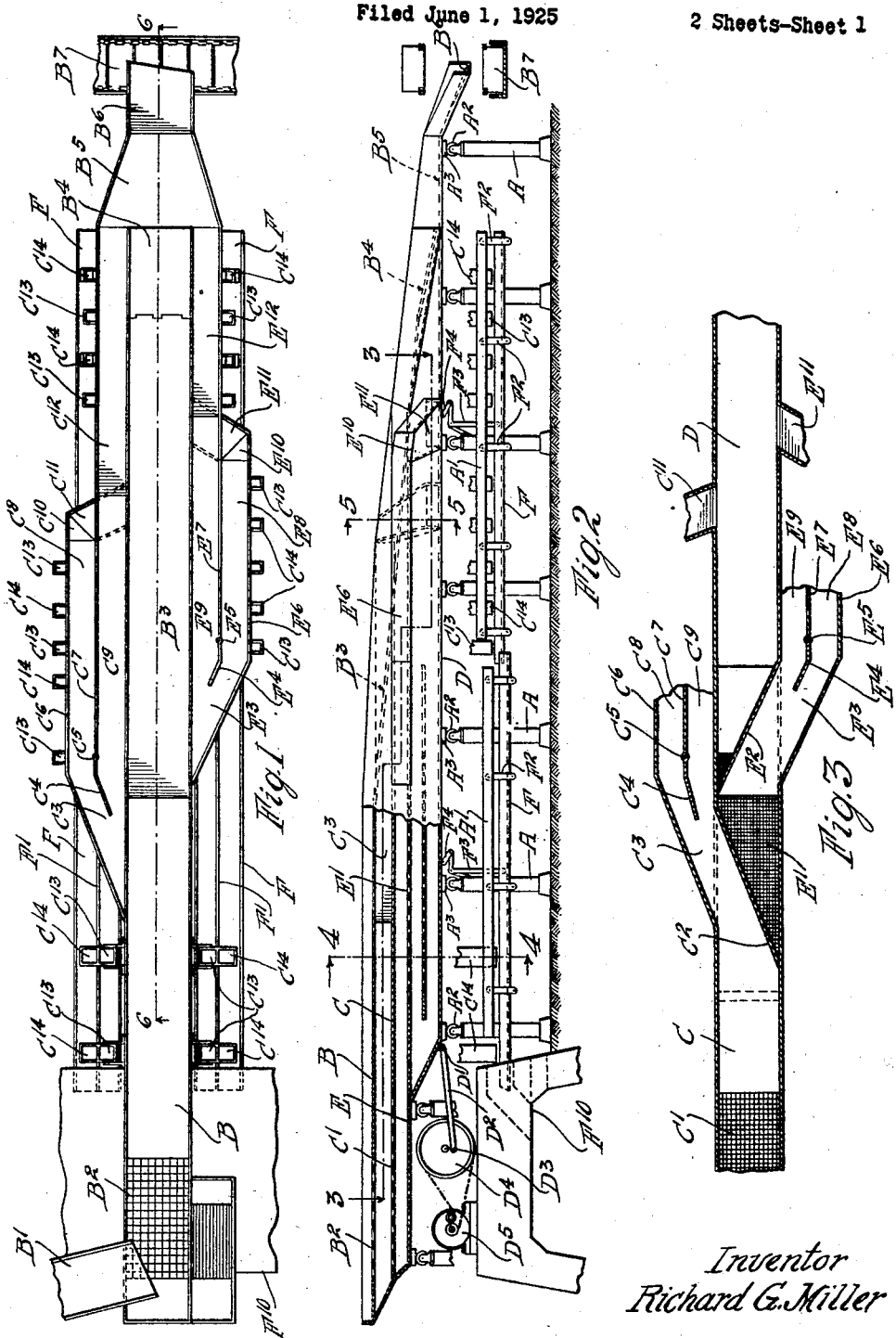

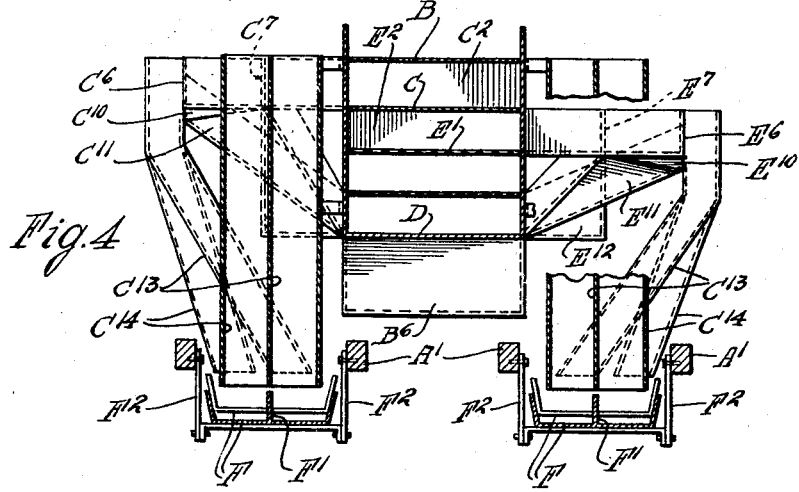
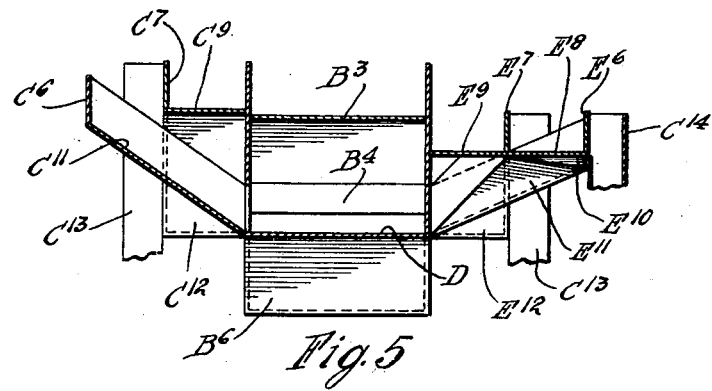
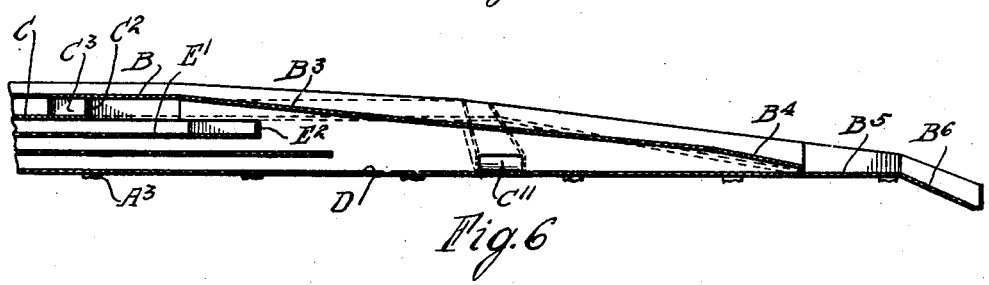

1,654,694

UNITED STATES PATENT OFFICE.

RICHARD G. MILLER, OF HUNTINGTON, WEST VIRGINIA, ASSIGNOR TO ROBERTS AND SCHAEFER COMPANY, OF CHICAGO, ILLINOIS, A CORPORATION OF ILLINOIS.

PICKING TABLE.

Application filed June 1, 1925. Serial No. 33,955.

My invention relates to a screening and picking device, and particularly to a coal handling device which is adapted to screen and grade coal. One object of my invention is to provide a device of the type described wherein a maximum picking area is provided. Another object is the provision of means for maintaining the material being picked in a layer of maximum extension and minimum depth. Another object is the provision of picking areas of maximum length and maximum accessibility. Other objects will appear from time to time in the course of the specification and claims.

I illustrate my invention more or less diagrammatically in the accompanying drawings, wherein:

Figure 1 is a plan view;

Figure 2 is a vertical side view with parts broken away and in section;

Figure 3 is a section along the line 3—3 of Figure 2;

Figure 4 is a section along the line 4—4 of Figure 2;

Figure 5 is a section along the line 5—5 of Figure 2; and

Figure 6 is a section along the line 6—6 of Figure 1.

Like parts are indicated by like symbols throughout the specification and drawings.

A A are any suitable supporting frame members. $A^1$ $A^1$ are any suitable horizontal frame members. $A^2$ $A^2$ are rollers upon said supporting members A and in engagement with the moving track members $A^3$ $A^3$ upon the bottom D of the screen structure.

B is an upper conveying surface adapted to receive material from the feed spout $B^1$. $B^2$ is a relatively coarse screen adapted to screen the material as it passes from the spout $B^1$. Preferably it will permit nut as well as egg to pass through, leaving the lump on the upper level. The member B may be downwardly inclined as at $B^3$; terminating in a hinged or otherwise adjustable go-down plate $B^4$ leading to the terminal member $B^5$ of the screening assembly, which discharges by means of the spout or chute $B^6$ to any suitable conveyor herein illustrated as $B^7$.

C is the egg deck provided for example with the screen $C^1$ adapted to permit the nut to pass therethrough, while retaining the egg. The flow of material along the deck C is laterally deflected for example by the baffle plate $C^2$ to the outwardly inclined trough $C^3$. $C^4$ is a deflecting blade, which may be fixed if desired, but is herein shown as pivoted or adjustable about the pivot $C^5$. $C^6$ is the outer wall of the laterally positioned trough and $C^7$ a central wall, which may divide the trough into two parts $C^8$ and $C^9$, herein shown as of substantially equal width. The picking trough portion $C^8$ is provided with go-down plates $C^{10}$ $C^{11}$ adapted to deliver the picked coal to the bottom D of the screening assembly. Pivoted to the bottom D at $D^1$ is the pitman $D^2$ pivoted on the crank pin $D^3$ on the crank disk $D^4$ which is driven from the motor $D^5$ to reciprocate the picking table assembly. The trough $C^9$ continues beyond the go-down plates or chutes $C^{10}$ $C^{11}$ and discharges along the generally downwardly inclined straight portion $C^{12}$ to the terminal portion $B^5$ of the screen. $C^{13}$ are fixed bone chutes and $C^{14}$ are stone chutes positioned along the picking troughs.

E is the egg deck being provided for example with the screen $E^1$ to permit the escape of the fines. The material passing thereover is deflected for example by the baffle plate $E^2$ to the outwardly inclined portion $E^3$ which is provided with a deflector plate $E^4$ similar to $C^4$ and pivoted at $E^5$. $E^6$ is the outer wall and $E^7$ the central wall dividing the trough into the two portions $E^8$ and $E^9$, and substantially identical with the portions $C^8$ $C^9$ earlier described, but on the opposite side of the screening assembly. The coal passing over the portion $E^8$ is discharged over the plates and chutes $E^{10}$ $E^{11}$, into the lowest deck D and the material passing over $E^9$ continues across the section $E^{12}$ to the terminal member $B^5$ of the screen.

F are any suitable spoils troughs divided by the central wall $F^1$ into two parallel sections. It will be understood that the bone chutes $C^{13}$ discharge into one spout and the stone chutes $C^{14}$ into the other, so that the material picked from the coal is thus classified. The chutes F are suspended by means of any suitable links $F^2$ and are given a conveying movement along a direction opposite to the direction of movement of the screening assembly by means for example of the bell crank lever $F^3$ and the links $F^4$. They may discharge the material to any suitable chute or bin or a plurality of chutes and bins diagrammatically shown as $F^{10}$, the details of which form no part of the present invention.

The use and operation of my invention are as follows:

The mixed coal, as it passes for example from the right, is discharged by the chute or spout $B^1$ over the lump deck. All but the lump passes through the screen $B^2$, and the lump may be picked, when necessary, as it passes over the section preceding the lateral extension of the egg and nut picking troughs. It passes thence down the inclined section $B^3$ and thus to the conveyor.

The finer coal which passes through the screen $B^2$ travels across the screen $C^1$ in the egg deck and the egg is thereby separated, the finer coal continuing on therethrough. The egg passes forwardly and is picked in the laterally positioned picking troughs $C^8$ and $C^{12}$, the material from $C^8$ finding its way to the bottom deck D the material passing along $C^{12}$ passing directly to the terminal area $B^5$. The screen $E^1$ permits the passage of the finer material but retains the nut, which is similarly picked along the sections $E^8$ and $E^{12}$, and similarly finds its way to the deck D or terminal portion $B^5$. The material on the deck D passes on beneath the hinged or adjustable portion $B^4$ and is discharged down the chute $B^6$ with the rest of the coal. Any suitable take-off means may be provided, where necessary, to eliminate the fines where that is desired. Otherwise the entire volume of coal, except for the material picked out of it, is discharged to the conveyor $B^7$.

As the various sizes of coal pass along the various picking troughs the stone and the bone are dropped in the various disposal chutes provided therefor. The stone chutes all discharge to one side of the spoils troughs and the bone to the other and the classified materials pass toward the feed end of the screen and are deposited in any suitable chutes, conveyors or bins.

By separating the egg and the nut and by providing a plurality of picking troughs for both the egg and the nut and by separately picking the lump I provide a maximum area or length along which the picking may be done and radically thin the stream of coal as it passes through the picking zone. This lightens the work for the pickers, makes it possible to put a maximum number of pickers on a given volume of coal and greatly reduces the amount of bone and stone which escapes the pickers. The selective or classifying feature of the spoils trough enables me to dispose of two types of picking refuse or of rejected material, without re-classification, re-picking or re-screening.

In effect I divide the material by screening, into a plurality of streams of different classification of material and subsequently subdivide these streams, passing each subdivision of such a stream to a separate picking trough. I have illustrated this sub-division as taking place at a point laterally out of line with the main screen and conveying structure but obviously the separation might take place within the confines of such a structure.

I claim:

1. In a reciprocatory picking table, a centrally disposed material conveying portion and means for delivering thereto the material to be picked, means for separating the material so delivered into a plurality of separate streams of different grades, a plurality of picking wings longitudinally spaced along the table and laterally extending from said material conveying portion, and means for delivering thereacross the said separate streams of material, and means for returning said streams to the central material conveying portion.

2. In a reciprocatory picking table, a material conveying portion and means for delivering material thereto, a plurality of longitudinally spaced picking wings and means for deflecting thereto material from the conveying portion and a go-down plate adapted to deliver material from one of said picking wings beneath another of said picking wings, back to the primary material conveying portion.

3. In a reciprocatory picking table, a material conveying deck and means for reciprocating it, a picking wing mounted on the table and associated therewith, a longitudinal partition intermediate the sides of said picking wing, and means for returning the material passing on one side of said partition to the material conveying deck intermediate the ends of the picking wing.

4. In a reciprocatory picking table, a material conveying deck and means for reciprocating it, a picking wing associated therewith, a longitudinal partition intermediate the sides of said picking wing, and means for returning the material passing on one side of said partition to the material conveying deck intermediate the ends of the picking wing, comprising a go-down plate and a generally transverse chute element in connection with the outer side of said wing and extending beneath the inner side to the material conveying deck.

5. In a reciprocatory picking table, a material conveying deck and means for reciprocating it, a picking wing outwardly projecting therefrom, comprising a plurality of parallel picking troughs of different lengths, and means for conveying the material passing along the outer of said troughs inwardly beyond the inner of said troughs intermediate the ends of the picking wing.

6. In a reciprocatory picking table, a material conveying portion and means for reciprocating it and means for delivering thereto the material to be picked, means for separating the material so delivered into a plurality of streams of different grades, means for subdividing said streams into a plurality of sub-streams, a plurality of picking wings mounted on said table and means for directing said sub-streams each to a separate picking wing, said picking wings being aligned along and outwardly projecting from the sides of said table.

Signed at Huntington, county of Cabell and State of West Virginia, this 25th day of May, 1925.

RICHARD G. MILLER.